Figure 1:
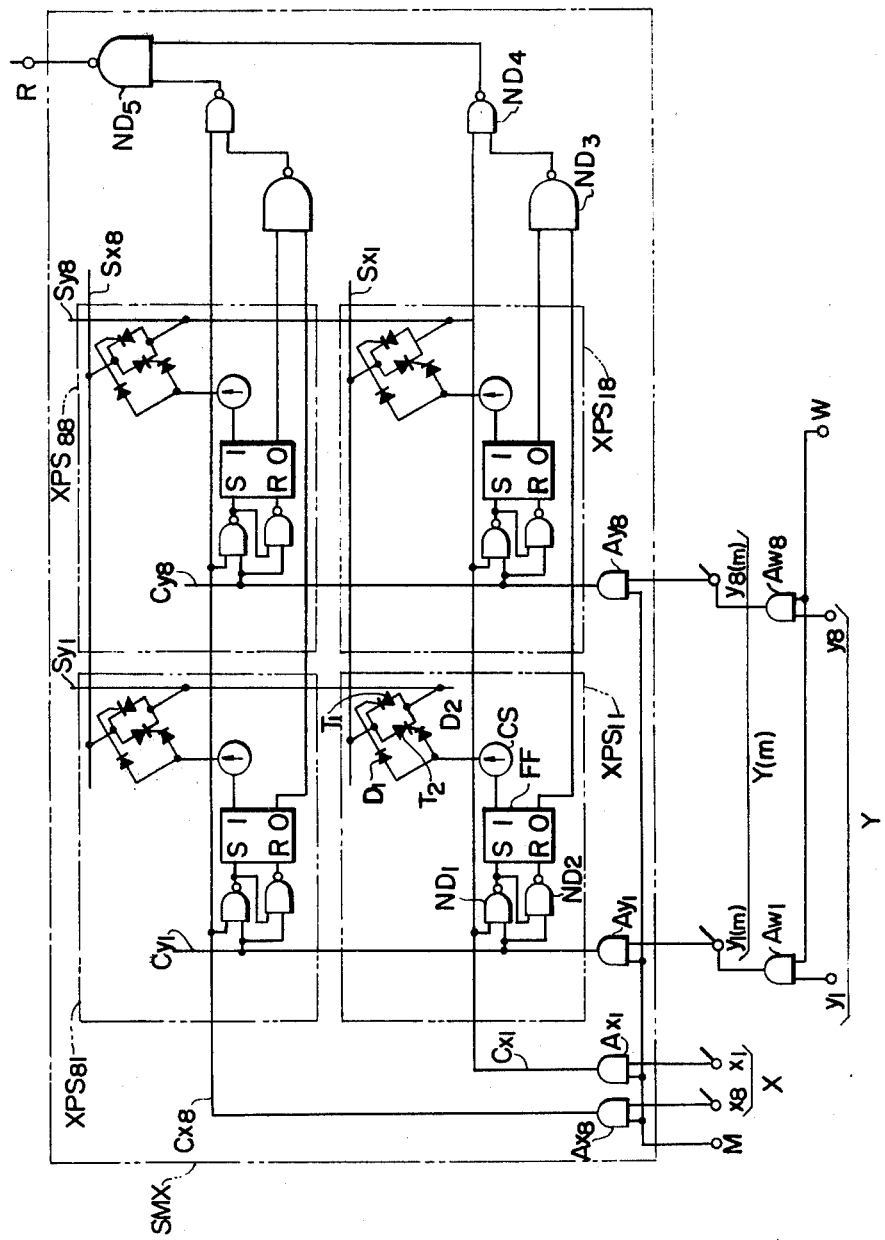

United States Patent [19]

Mukaemachi et al.

[11] 4,068,215
[45] Jan. 10, 1978

[54] CROSS-POINT SWITCH MATRIX AND MULTISTAGE SWITCHING NETWORK USING THE SAME

[75] Inventors: Takuji Mukaemachi, Yokohama; Shiro Enami, Hiratsuka, both of Japan

[73] Assignee: Hitachi, Ltd., Japan

[21] Appl. No.: 696,186

[22] Filed: June 15, 1976

[30] Foreign Application Priority Data

June 16, 1975 Japan ................................. 50-71928

[51] Int. Cl.² ............................................. H04Q 3/00
[52] U.S. Cl. ........................... 340/166 R; 179/18 GF
[58] Field of Search ...... 340/166 R, 166 FE, 166 EL; 179/18 GF

[56] References Cited

U.S. PATENT DOCUMENTS

| | | | |
|---|---|---|---|
| 3,618,024 | 11/1971 | Leger et al. | 179/18 GF |
| 3,626,371 | 12/1971 | Hennes | 340/166 R |
| 3,633,163 | 1/1972 | Birchmeier | 340/166 R |
| 3,692,945 | 9/1972 | Maier | 179/18 GF |
| 3,760,361 | 9/1973 | Leger et al. | 340/166 R |

*Primary Examiner*—Donald J. Yusko
*Attorney, Agent, or Firm*—Craig & Antonelli

[57] ABSTRACT

A plurality of cross-point matrices each having a plurality of holding circuits respectively associated with a corresponding cross point are arranged in multiple stages, which are linked with each other to form a multi-stage switching network. Each switch matrix is provided with an associated NAND gate connected to gates capable of being selectively impressed with the signals representing the state of the holding circuits in a row or column within the particular switch matrix. The output of the NAND gate is connected to an OR gate for each stage.

8 Claims, 2 Drawing Figures

CROSS-POINT SWITCH MATRIX AND MULTISTAGE SWITCHING NETWORK USING THE SAME

The present invention relates to the selection and control of a vacant channel in a switching network using semiconductor switching elements.

The conventional switching network as represented by a telephone exchange employs mechanical-contact cross-point switches such as reed relays and cross-bar switches. With the recent marked development of semiconductor technology, however, a semiconductor cross-point switch has begun to be practically used.

The semiconductor cross-point switch may be roughly classified into a PNPN switch system (including PNPN diodes and PNPN thyristors and an FET switch system (including J-FET and MOS FET). Excepting the switch system employing the PNPN diodes, every type of cross-point switch comprises the above-mentioned PNPN thyristors or FET as a cross-point element for connecting or disconnecting a couple of terminals, a holding circuit for storing the information on the connected or disconnected state of the cross-point element, a drive circuit inserted between the output of the holding circuit and the cross-point element for driving the cross-point element in response to the state of the holding circuit, and an input logic circuit connected to the input of the holding circuit. The drive circuit may take any of various forms depending on the construction of the holding circuit and the cross-point element and, if required, may be integral with the holding circuit.

As in the case of a mechanical switch, such cross-point switches may be arranged in $m$ lines and $n$ columns to form an $m \times n$ switch matrix. Further, a plurality of such switch matrices may be combined appropriately to construct a multi-stage switching network in link form.

In order to connect a couple of subscribers by operating such a switching network, it is necessary to select a vacant channel. In the conventional cross-bar exchange system, a three-line switch is used, and one of the three lines is designated as a control line (C line), the electric potential of which is checked for selection of a vacant channel. On the other hand, the electronic exchange of storage program type which is now making rapid progress employs what is called a map system in which a vacant channel is selected in accordance with the state of a link memory provided in the central processor.

Of the above-mentioned two methods for introducing semiconductor switches, the former is not economical in that an increased number of elements and pins involved leads to a reduced mounting efficiency for integrated circuitry and the requirement for additional hardware for checking the C line. On the other hand, the latter system, which requires a great number of expensive temporary memories, is also uneconomical for a small-capacity station.

An object of the present invention is to enable economic selection of a vacant channel in the switching network employing semiconductor cross-point switches.

The present invention is characterized in that the state of the holding circuits corresponding to cross-points included in each channel is read and the result of the reading determined, thus selecting a vacant channel.

Figure 2:
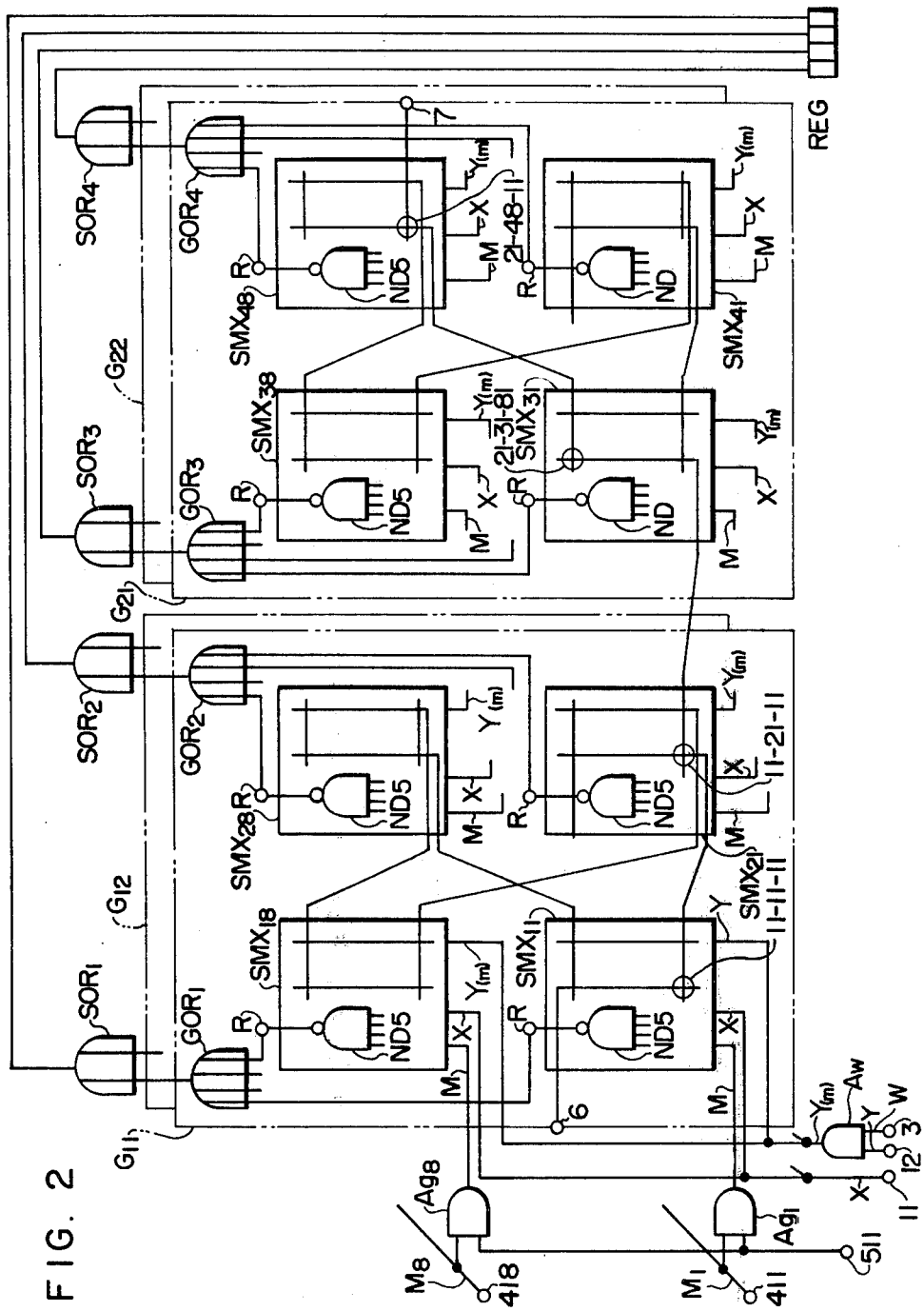

The above and other objects, features and advantages will be made apparent by the detailed description taken in conjunction with the accompanying drawings, in which:

FIG. 1 is a wiring diagram showing a 8 × 8 switch matrix having means for detecting the state of the holding circuits according to the present invention; and FIG. 2 is a wiring diagram showing a switching network having means for detecting a vacant channel according to the present invention.

First referring to FIG. 1 showing an 8 × 8 switch matrix SMX which provides a basis for the switching network according to the present invention, parts corresponding to only four cross-point switches XPS11, XPS18, XPS81 and XPS88 are shown by way of simplification. Between these cross-point switches, there are actually 60 similar cross points. Explanation below will be made only of the cross-point switch XPS11 of all the cross-point switches which have quite the same construction. In the cross-point switch XPS11, symbols T1 and T2 show PNPN thyristors for connecting and disconnecting the row line Sx1 and column line Sy1. The cathode gates of these thyristors are connected through the diodes D1 and D2 to the driving circuit CS respectively. The driving circuit CS, which is preferably a constant-voltage source, is connected to the "1" output terminal of the flip-flop FF. The set terminal S and reset terminal R of the flip-flop FF are connected to the outputs of the NAND gates ND1 and ND2 respectively. Each of the NAND gates ND1 and ND2 has two input terminals. The two input terminals of the NAND gate ND1 are connected to the row control line Cx1 and column control line Cy1 respectively, while the two input terminals of the NAND gate ND2 are connected to the row control line Cy1 and the output of the NAND gate ND1. The "0" output terminal of the flip-flop FF is applied to a NAND gate ND3 together with the "0" outputs of flip-flops FF of other cross-point switches in the row. There is provided another NAND gate ND4 having two input terminals which are connected to the output of the NAND gate ND3 and row control line Cx1 respectively. The output of the NAND gate ND4 is applied to a NAND gate ND5 together with the outputs of NAND gates ND4 of other rows.

The row control lines Cx1 to Cx8 and the column control lines Cy1 to Cy8 are connected, through the AND gates Ax1 to Ax8, and through Ay1 to Ay8, to the X signals x1 to x8 and modulated Y signals y1(m) to y8(m), respectively. The remaining input terminal of each of the AND gates Ax1 to Ax8 and Ay1 to Ay8 is impressed with the M signal. The modulated Y signals y1(m) to y8(m) are connected through the AND gates AW1 to AW8, to the signals y1 to y8 respectively. The remaining input terminal of each of the AND gates AW1 to AW8 is impressed with the W signal.

The operation of this switch matrix will be explained below.

In controlling the switch matrix of FIG. 1, the M signal is set at "1". Further, in opening and closing the cross-point switches of the switch matrix SMX, the W signal is set at "1", while it is designated as "0" for detection of the state of the flip-flop FF.

First, assume that with the W signal at "1", the X signal in the form of x1 and Y signal in the form of y1 are both in the state of "1", namely, that the /cross-point switch XPS11 shown in the drawing is selected. The NAND gate ND1 produces a "0" output thereby to set the flip-flop FF. Thereby, the driving circuit CS energizes the diodes D1, D2 and the PNPN thyristors T1, T2, thus closing between the row line Sx1 and the column line Sy1. At the same time, an output signal in the same "1" state as that of the flip-flop FF is produced at the R output terminal of the NAND gate ND5. By checking this signal, a normal operating condition may be verified.

Next, suppose the W, $x1$ and $y1$ signals are "1", "0" and "1" respectively, namely, that another cross-point switch in the same matrix is selected. The NAND gate ND2 produces a "0" output thereby to reset the flip-flop FF, thus cutting off the PNPN thyristors T1 and T2 as cross-point elements. In any other $x1$–$y1$ combinations with the W signal "1", the flip-flop FF of the cross-point switch XPS11 remains unchanged.

In the case where the x1 signal is "1" with the W signal at "0", that is, where the state of the row comprising the eight cross-point switches XPS11 to XPS18 is to be detected, the Y signals $y1$ to $y8$ are inhibited by the W signal and then the flip-flops FF in the row remain unchanged. Under this condition, the "0" outputs of the flip-flops FF are applied through the NAND gate ND3 to the NAND gate ND4. As a result, "1" and "0" outputs are produced at the R terminal in accordance with the idle and busy conditions of the row respectively.

In this way, it is possible to determine whether each of rows in the switch matrix SMX is idle or busy, by checking the R terminal while sequentially designating the switches by X signal with the W signal fixed to "0". This operation does not affect the flip-flop or lines in operation.

Explanation will be made below of a switching network employing a multiplicity of switch matrices shown in FIG. 1.

An embodiment of the present invention shown in FIG. 2 illustrates a switching network in four stages. Four matrix switch groups SMX11 to SMX18, SMX21 to SMX28, SMX31 to SMX38, and SMX41 to SMX48 each containing 8 matrices are arranged in four stages connected in link. (For avoiding complexity, the drawing shows each switch matrix as containing only those parts corresponding to Sx and Sy lines and NAND gate ND5 of FIG. 1.) The switch matrices SMX11 to SMX18 and SMX21 to SMX28 make up a first link grid G11, while the switch matrices SMX31 to SMX38 and SMX41 to SMX48 constitute a second link grid G21. An actual switching network, as shown in the drawing under consideration, is composed of a plurality of the first link grids G11, G12, . . . and a plurality of the second link grids G21, G22, . . .

The outputs of NAND gates ND5 provided for respective switch matrices SMX11 to SMX18, SMX21 to SMX28 and SMX31 to SMX38 are connected to the inputs of the OR gates GOR1 to GOR3 respectively associated with the respective stages and link grids G11, G12, . . . and G21, G22, . . . The outputs of the OR gates GOR1 to GOR3, in turn, are connected to the inputs of the OR gates SOR1 to SOR3 provided for respective stages.

The outputs of the four OR gates SOR1 to SOR3 are connected to corresponding bit positions of the register REG.

Next, the wiring of the signal lines, M, X, Y ($m$) and W of the switch matrix will be explained. Although the detailed wiring is shown in the drawing only for the first-stage switch matrices SMX11 to SMX18 of the link grid G11, similar wiring is provided for the remaining stages and link grids the illustration of which is omitted for simplicity's sake. The X and Y ($m$) signals of the switch matrices SMX11 to SMX18 are respectively commonly connected, and they are further connected commonly with the X and Y ($m$) signal lines of the first-stage switch matrices of the other link grids G22, . . . at the X signal terminal 11 and the output of the AND gate AW, respectively. Also, the M signal lines of the switch matrices SMX11 to SMX18 are connected to the output terminals of the AND gates Ag1 to Ag8, to which the M signals M1 to M8 respectively are applied as one input thereto and the selection signal G11 for the grid G11 as the other input. The Y signal terminal 12 and W signal terminal 3 SMX11 to SMX18 of all the other switch matrices are connected to the input of the AND gate AW.

In the above circuit arrangement, a determination signal is applied to each signal terminal and, as explained with reference to FIG. 1, a given cross-point in a given switch matrix is designated, thus setting or resetting the holding circuit (flip-flop) of the particular cross-point. At the same time, such a condition can be read. In the case where the cross-point 11-11-11 enclosed in a circle in the switch matrix SMX11 is to be controlled, for example, the M signal terminal 411 and G signal terminal 511 are set at "1", the terminals $x1$ and $y1$ (See FIG. 1) of the X and Y signal terminals 11 and 12 being also set at "1". If this cross-point 11-11-11 is to be closed, namely, if the holding circuit is to be set, the W signal terminal is set at "1"; while if the state of the row including the cross-point 11-11-11 is to be read, the W signal is set at "0", thus making possible the operation explained with reference to FIG. 1. As will be obvious, with the W signal set at "1", a "1" signal appears at the R output terminal of the NAND gate ND5 of the switch matrix SMX11; while with the W signal set at "0", signals in the states of "1" and "0" are produced at the R terminal depending on the idle or busy conditions of the row respectively. In other words, a set of signals M, G, X and Y makes up a piece of address information designating a corresponding cross point; while the W signal constitutes another piece of information contributing to the selection of the operation of controlling or reading the state of the row including the designated cross point. It will be easy to understand that the same can be said of the operation of the switch matrices other than SMX11 in the same stage, the switch matrices SMX21 to SMX28 in the other stages and link grids.

As an example, explanation will be made of the case in which a channel usable for connection between the input terminal 6 and the output terminal 7 is searched. While maintaining the W signal at "0", a cross-point switch in each stage is designated by the use of M, G, X and Y signals for selection of a channel between the input terminal 6 and the output terminal 7. In this connection, assume that cross-point switches 11-11-11, 11-12-11, 21-31-38 and 21-48-11 have been designated as shown. The outputs R of the NAND gates ND5 of the switch matrices SMX11, SMX21, SMX31 and SMX48 assume the state of "1" or "0" depending on the states of the rows associated with the respective cross-point switches. The "1" state of the R output indicates that the designated particular row is idle and the "0" signal that it is busy. The outputs R of the NAND gates ND5 of the switch matrices SMX11, SMX21, SMX31 and SMX48 are applied, through the OR gates GOR1, GOR2, GOR3 and GOR4, through the SOR1, SOR2, SOR3 and SOR4, to the corresponding bit positions of the register REG respectively. As a result, in the event that all the 4 bits of the register REG are in the state of "1", it shows that a channel between the input terminal 6 and the output terminal 7 containing the designated 4 cross points 11-11-11, 11-21-11, 21-31-81 and 21-48-11 is idle or available. If even one bit of the register REG is "0", by contrast, an indication is provided that the particular channel is not available. In the latter case, another set of signals, G, M, X and Y is given which may represent another channel that may be able to successfully connect the input terminal 6 and the output terminal 7. Similar processes are repeated for any number of channels until a channel is found whereby the connection between the input terminal 6 and the output terminal 7 is capable of being established.

When an idle channel is found for connection between the input terminal 6 and output terminal 7, then the W signal is set at "1", so that the signal set of G, M, X and Y associated with the particular available channel is applied to a corresponding switch matrix of each stage, thereby setting the holding circuits of the related cross points. As explained with reference to FIG. 1, the holding circuit or flip-flop FF for each cross point, when newly set, causes a "1" signal to be produced at the output R of the NAND gate ND5 of the switch matrix associated with the particular cross-point. This serves to confirm the successful establishment of the connection by the designated channel in response to the "1" state of all the 4 bits of the register REG.

It should be noted that the operations of vacant channel selection and the connection are substantially the same, the only difference being the fact that the W signal information is set at "1" or "0".

The access time from the delivery of address information on cross points until the receipt of idle channel information or the result of channel-searching operation is determined by the types of the OR gates of the cross points. If TTL or CMOS is used for such elements, the access time of about several microseconds or several tens of microseconds is easily achieved.

As will be seen from the foregoing description, the present invention permits the information on the holding circuits of the cross point switches to be utilized for vacant channel selection by addition of only a small amount of hardware.

Such an addition includes, in the above-mentioned embodiment, two NAND gates (ND3 and ND4) for each row and one NAND gate (ND5) for each switch matrix. In view of the small space required for these additional logic circuits, the resulting cost increase is negligible in circuit integration of the whole switch. Also, the terminal addition for each switch matrix is the one terminal of R, which little affects the integrating efficiency in packaging.

Further, in view of the fact that detection is made directly from the holding circuits of the cross-point switches, the trouble of contradiction between memory and actual state of switching network which sometimes occurs in the map system is hardly encountered. Furthermore, a very high speed detection is possible without affecting the paths busy with speech. As a further advantage, the invention may be used for checking the connecting operation for an improved reliability of connection, rendering the general operation of the switching network both reliable and economical.

What is claimed is:

1. A cross-point switch matrix comprising:
   a plurality of bistable holding circuits respectively associated with a plurality of cross-points defined by rows and columns of a matrix;
   a plurality of cross-point elements being opened or closed in response to the state of their associated holding circuits;
   control means for selectively placing each respective bistable holding circuit in one of the bistable states thereof independently of the state of each other holding circuit;
   read means, provided in each row or column of said matrix, for reading out the state of at least one of the holding circuits associated with the cross-points arranged in said row or column and thereby identify whether a cross-point is open or closed; and
   logic OR means having inputs connected to the outputs of all of the read means provided in the respective rows or columns of said matrix; and
   wherein said control means is capable of simultaneously controlling the selective placing of plural ones of said holding circuits in one of the bistable states thereof.

2. A switch matrix according to claim 1, in which each of said holding circuits is a flip-flop having set and reset inputs and "1" and "0" outputs.

3. A switch matrix according to claim 1, in which each of said cross-point switches is a PNPN thyristor.

4. A switch matrix according to claim 3, in which said control means for each of said holding circuits includes a couple of NAND gates.

5. A switch matrix according to claim 1, in which each of said read means includes a pair of NAND gates.

6. A switch matrix according to claim 5, in which said first logic OR means comprises a NAND gate.

7. A multi-stage switching network, wherein multiple stages of such switch matrices as in claim 1 are linked with each other, and the output of said first logic OR means of each of the switch matrices is applied to the input of second logic OR means in each of said stages.

8. A multi-stage switching network according to claim 7, in which said second logic OR means comprises an OR gate.

* * * * *